US009021436B2

(12) United States Patent
Sathya et al.

(10) Patent No.: US 9,021,436 B2
(45) Date of Patent: Apr. 28, 2015

(54) AUTOMATIC RECONNECTION OF DEBUGGER TO A REACTIVATED APPLICATION

(75) Inventors: Narayan Ashok Sathya, Karnataka (IN); Sadagopan Rajaram, Andhra Pradesh (IN); Satyanarayana Reddy Duggempudi, Andhra Pradesh (IN); Yashwardhan Singh, Andhra Pradesh (IN); Istvan Cseri, Seattle, WA (US); Kunal R. Gandhi, Redmond, WA (US)

(73) Assignee: Microsoft Technology Licensing LLC, Redmond, WA (US)

(*) Notice: Subject to any disclaimer, the term of this patent is extended or adjusted under 35 U.S.C. 154(b) by 889 days.

(21) Appl. No.: 12/963,626

(22) Filed: Dec. 8, 2010

(65) Prior Publication Data

US 2012/0151446 A1    Jun. 14, 2012

(51) Int. Cl.
  *G06F 9/44*     (2006.01)
  *G06F 11/36*    (2006.01)

(52) U.S. Cl.
  CPC .................................. *G06F 11/3656* (2013.01)

(58) Field of Classification Search
  None
  See application file for complete search history.

(56) References Cited

U.S. PATENT DOCUMENTS

| | | | |
|---|---|---|---|
| 6,671,825 B1 * | 12/2003 | Joshi et al. | 714/38.11 |
| 6,941,492 B1 * | 9/2005 | Ezra et al. | 717/129 |
| 7,051,316 B2 * | 5/2006 | Charisius et al. | 717/103 |
| 7,117,483 B2 * | 10/2006 | Dorr et al. | 717/124 |
| 7,360,202 B1 * | 4/2008 | Seshadri et al. | 717/106 |
| 7,577,962 B2 | 8/2009 | Bendapudi et al. | |
| 7,688,813 B2 * | 3/2010 | Shin et al. | 370/373 |
| 8,161,328 B1 * | 4/2012 | Wilshire | 714/34 |
| 8,336,029 B1 * | 12/2012 | McFadden et al. | 717/124 |
| 8,752,024 B2 * | 6/2014 | Bates | 717/124 |
| 2003/0177476 A1 | 9/2003 | Sarma et al. | |
| 2004/0117769 A1 * | 6/2004 | Lauzon et al. | 717/125 |
| 2004/0210872 A1 * | 10/2004 | Dorr et al. | 717/124 |
| 2005/0176460 A1 | 8/2005 | Hamanaga et al. | |
| 2005/0223359 A1 * | 10/2005 | Rao Nagaraju et al. | 717/124 |
| 2005/0288001 A1 | 12/2005 | Foster et al. | |

(Continued)

OTHER PUBLICATIONS

Feng et al., "The Implementation of a Mobile Java Debug Tool", 2009 IEEE, Scalcom-Embeddedcom'09, Sep. 25, 2009, pp. 109-114; <http://ieeexplore.ieee.org/stamp/stamp.jsp?tp=&arnumber=5341588>.*

Higashino et al., "Debugging Mobile Agent Systems", 2013 ACM, iiWAS Dec. 2, 2013, pp. 1-4; <http://dl.acm.org/results.cfm?h=1&cfid=613703026&cftoken=17771440>.*

(Continued)

*Primary Examiner* — Thuy Dao
*Assistant Examiner* — Ben C Wang
(74) *Attorney, Agent, or Firm* — Kevin Gullivan; Kate Drakos; Micky Minhas

(57) ABSTRACT

Although a software developer writing software for a mobile device typically performs the development and some of the debugging of the application on a software development computer, the application also has to be debugged as it passes through the deactivate, terminate and reactivate states as it executes on the mobile device. To debug an application the developer can launch the debugger on the software development computer. The debugger can launch the application on the mobile device. If an event that terminates the application occurs, the debugger connection is terminated. In accordance with aspects of the subject matter disclosed herein, the debugger is automatically reattached to the restarted (activated) application. Reattaching the debugger automatically to the restarted application allows the developer to debug the mobile device application as an application passing through multiple states rather than debugging multiple instances of an application.

20 Claims, 5 Drawing Sheets

(56) References Cited

U.S. PATENT DOCUMENTS

| | | | |
|---|---|---|---|
| 2006/0206873 A1 | 9/2006 | Argade | |
| 2006/0277528 A1* | 12/2006 | Chen et al. | 717/124 |
| 2007/0011656 A1* | 1/2007 | Kumamoto | 717/124 |
| 2007/0168994 A1* | 7/2007 | Barsness et al. | 717/129 |
| 2007/0250814 A1 | 10/2007 | Bendapudi et al. | |
| 2007/0288896 A1* | 12/2007 | Lee | 717/124 |
| 2008/0109793 A1* | 5/2008 | Buettner | 717/124 |
| 2008/0126865 A1* | 5/2008 | Lee | 714/34 |
| 2008/0155505 A1* | 6/2008 | Lin et al. | 717/124 |
| 2008/0276226 A1* | 11/2008 | Farchi et al. | 717/129 |
| 2008/0295114 A1 | 11/2008 | Argade et al. | |
| 2009/0178030 A1* | 7/2009 | Golan et al. | 717/129 |
| 2009/0228861 A1* | 9/2009 | Burton | 717/100 |
| 2010/0306764 A1* | 12/2010 | Khanna | 718/1 |
| 2011/0154301 A1* | 6/2011 | Klinker et al. | 717/135 |
| 2011/0264960 A1* | 10/2011 | Cho | 714/37 |
| 2012/0110353 A1* | 5/2012 | Ehrlich et al. | 713/300 |
| 2012/0151452 A1* | 6/2012 | Zinkovsky et al. | 717/129 |
| 2012/0278791 A1* | 11/2012 | Geist | 717/125 |
| 2012/0289287 A1* | 11/2012 | Kokubo | 455/556.1 |
| 2013/0014086 A1* | 1/2013 | McFadden et al. | 717/125 |
| 2013/0019228 A1* | 1/2013 | Bates | 717/125 |
| 2013/0074042 A1* | 3/2013 | Engelbeck et al. | 717/125 |
| 2014/0366004 A1* | 12/2014 | Cai et al. | 717/124 |

OTHER PUBLICATIONS

Patzke et al., "From the Debug Research Labs: Debugging Android", IQ Magazine vol. 9, No. 1, 2010, pp. 1-10; <http://www.lauterbach.com/publications/debugging_android.pdf>.*

"Execution Model Overview for Windows Phone", Retrieved at << http://msdn.microsoft.com/en-us/library/ff817008%28VS.92%29.aspx >>, Sep. 3, 2010, pp. 6.

"Understanding the Windows Phone Application Execution Model, Tombstoning,part 2" Retrieved at << http://thewindows7site.com/forum/archive/index.php/t-18599.>>, Jul. 16, 2010, pp. 3.

"VS 2008 Age-old problem, infuriating!" Retrieved at << http://www.vbforums.com/showthread.php?p=3871476 >>, Aug. 25, 2010, pp. 3.

Hsia, Calvin, "Dynamically attaching a debugger" Retrieved at << http://blogs.msdn.com/b/calvin_hsia/archive/2006/08/25/724572.aspx>>, Aug. 25, 2006,pp. 2.

Ashley, James E., "New debugging behavior after tombstone" ,Retrieved at << http://social.msdn.microsoft.com/Forums/en-US/windowsphone7series/thread/49c202e5-426a-4f81-8779-64b7e71ea6a7>>, Sep. 23, 2010, p. 1.

"How to: Launch the Debugger Automatically" Retrieved at << http://msdn.microsoft.com/en-us/library/a329t4ed.aspx>>, Retrieved Date: Oct. 4, 2010, pp. 2.

* cited by examiner

AUTOMATIC RECONNECTION OF DEBUGGER TO A REACTIVATED APPLICATION

BACKGROUND

A mobile device is a pocket-sized programmable computing device that is capable of doing a number of functions formerly performed by a plurality of other devices including traditional telephones and/or portable or desktop computers. A mobile device typically has a display screen with touch input and/or a miniature keyboard. A personal digital assistant (PDA) is a type of mobile device in which the input and output are often combined into a touch-screen interface. A smart phone is another type of mobile device that offers more advanced computing ability and connectivity than a contemporary basic feature phone. A feature phone is a mobile device that is distinguished from a PDA and a smart phone by having proprietary operating system (OS) firmware. Third-party software is often only supported in a limited way, although this may be changing as newer versions of feature phone software become more powerful.

SUMMARY

A debugger executing on a software development computer can be automatically reattached to a reactivated application running on a mobile device. The debugger is reattached programmatically, without user intervention. To the developer debugging the application, it appears that only one debug session is used to debug the application as it transitions between a plurality of different states on the mobile device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
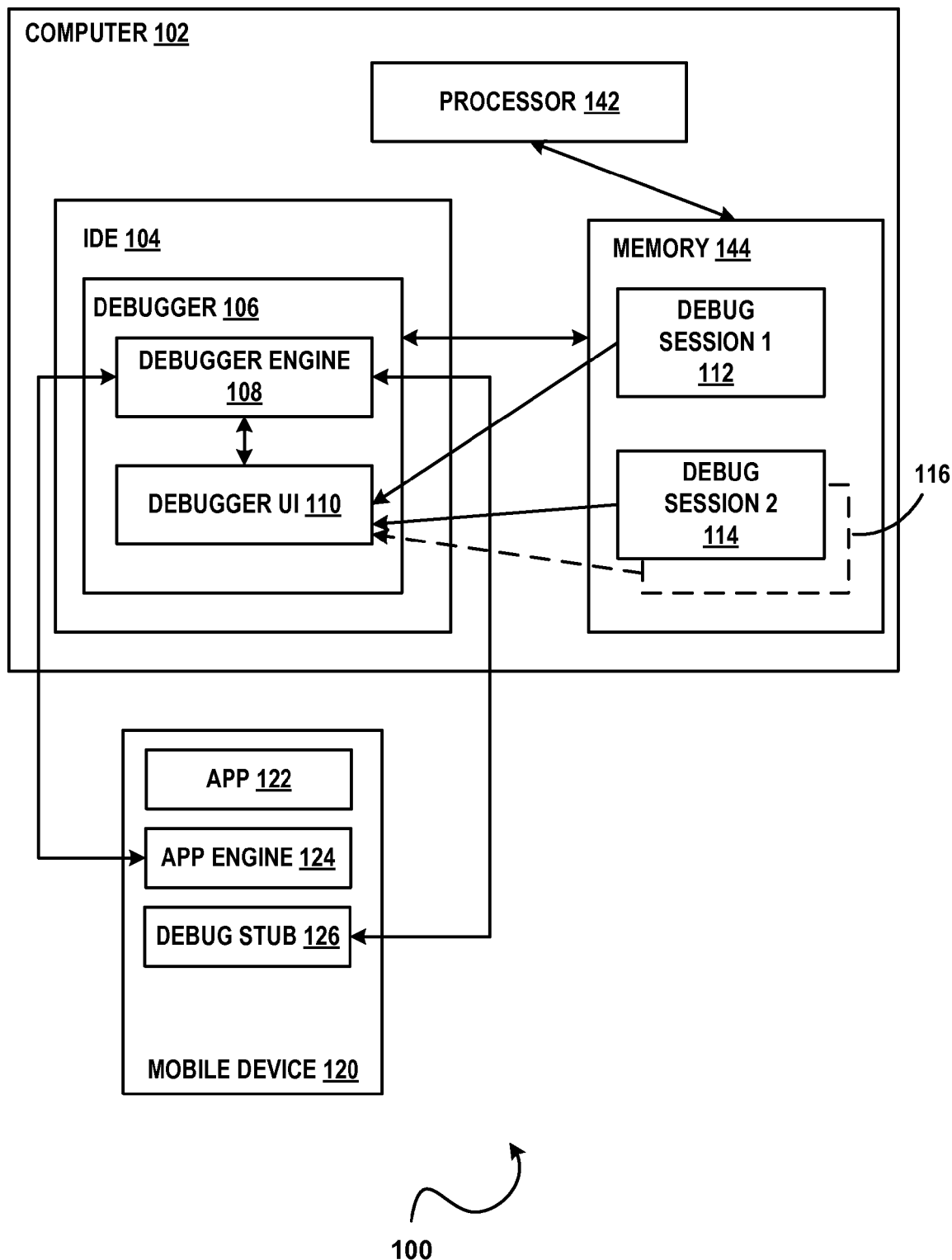
FIG. 1 illustrates an example of a system 100 that automatically reattaches a debugger to a reactivated application on a mobile device in accordance with aspects of the subject matter disclosed herein.

On a full-sized computer multiple applications can remain active for long periods of time because of the computer's robust power supply. Desktop computers usually are connected to a wall outlet. Laptop and notebook computers typically have relatively powerful and long lasting batteries or can be connected to a wall outlet. In contrast, a computing device whose utility relies in part upon its smaller size, such as a smart phone or other mobile computing device, typically has a less powerful and shorter-lived portable power supply. When the power supply to a mobile device becomes compromised, (e.g., its battery runs down) an unacceptable user experience can result. For example, a user may not receive an incoming call when the remaining power in a power supply is insufficient.

To conserve power and keep the mobile device responsive, some operating systems for mobile devices do not allow multiple applications to remain active on the mobile device. That is, some mobile device application models allow only one application to run at a time or do not allow third party application to run in the background, to eliminate the possibility of background applications making the mobile device sluggish and to conserve the battery. The operating system terminates an application's process when the user navigates away from the application or when the application invokes a functionality that pushes it into the background. If the user navigates back to the application, the operating system restarts the application. However, making it seem to the user as if an application has remained active can provide a good user experience.

For example, suppose a user is running an application, is interrupted by an incoming call, and then comes back to the original application. To provide the user the experience that the application continued to run after the user navigated away, the application would pick up where it left off. To provide a seamless transition back to the restarted application, a process called tombstoning can be performed. When an application is tombstoned, it is paused, then terminated. The tombstoned application can temporarily store information about the application that can help it return to the same place when it is resumed. This information can be stored in a memory store. When the application is suspended, the application can be unloaded. If the user returns to the application (e.g., by pressing the back key on the mobile device), the application can be resumed. The temporary application information can be restored so that the application resumes at the same place it was when it was paused (referred to as "hydrating"). Tombstoning can provide a seamless transition from a paused state to an active state without the user knowing that the application was actually terminated and reactivated.

The lifecycle of a mobile device application includes the following events: launching the application, deactivating the application, closing or terminating the application, and activating or restarting the application. Activating and deactivating the application are events that occur during tombstoning. An application that is being deactivated is being prepared to be suspended by the mobile device. Temporary state can be saved in the deactivation event handler. Saving temporary state at the time of deactivation enables the application to be activated in such a way that the user continues the application from the state it was in when it was deactivated.

A developer who develops software for a mobile device, typically performs the development and some of the debugging of an application for a mobile device on a software development computer. However, some parts of the debugging process have to take place when the application is executing on the mobile device. In particular, the application has to be debugged as it passes through states including deactivation, termination and activation as it executes on the mobile device. These states can occur during tombstoning. To debug an application the developer can launch the debugger on the software development computer. The debugger can launch the application on the mobile device. If an event that terminates the application occurs, the debugger connection is terminated. In accordance with aspects of the subject matter disclosed herein, the debugger can be automatically reattached to the restarted (reactivated) application. Although another debug session is instantiated, the debug data appears in the same instance of the debugger user interface as did the debug data from the initial debug session. Reattaching the debugger automatically to the restarted application allows the developer to debug the mobile device application as an application passing through multiple states rather than debugging multiple instances of an application.

A mobile device debugger engine on a software development computer uses a debug stub executing on the mobile device to launch the application being debugged. During debugging, the debug stub is used to monitor the application for state changes. If the application is tombstoned and the application process is terminated, the debug stub is notified. The debug stub can notify the debugger engine. In response to detecting activation (restarting) of the application, the debugger engine can restart the application in debug mode.

Automatic Reconnection of Debugger to a Reactivated Application

FIG. 1 illustrates an example of a system 100 that automatically reattaches a debugger to a reactivated (restarted) application executing on a mobile device in accordance with aspects of the subject matter disclosed herein. All or portions of system 100 can reside on one or more computers. A computer is described below with respect to FIG. 3. All or portions of system 100 may reside on one or more software development computers such as the computers described below with respect to FIG. 4. The system 100 or portions thereof may comprise a portion of an integrated development environment (e.g., IDE 104) such as the ones described and illustrated below with respect to FIG. 4. System 100 or portions thereof may be provided as a stand-alone system or as a plug-in or add-in.

System 100 may include one or more of: a processor (such as processor 142), a memory 144, and a debugger 106. Other components well known in the art may also be included but are not here shown. It will be appreciated that one or more modules of debugger 106 can be loaded into memory 144 to cause one or more processors such as processor 142 to perform the actions attributed to the debugger 106. Debugger 106 may include modules comprising a debugger user interface 110, one or more modules comprising a debugger engine 108 and other modules appropriate to debuggers. It will be appreciated that debugger user interface module 110 can display watch windows, thread windows, call stack window, variables window, breakpoint window and tool tips, and so on.

Debugger 106, in accordance with aspects of the subject matter disclosed herein, can be a debugger that is adapted to debug mobile device applications. Debugger 106, in accordance with aspects of the subject matter disclosed herein, can be a debugger that is adapted to debug mobile device applications as they execute on the mobile device. Debugger 106 can receive user input and one or more data sources (not shown). In response debugger 106 can create a debug session such as debug session 1 112 on a software development computer. Debugger 106 may display substantially simultaneously in the debugger user interface 110: source code of a program under interactive development and run time debugging information based on data structures and/or objects associated with the application or program being debugged. The information displayed in the debugger user interface 110 may be displayed automatically (e.g., without human intervention to request the display of the information). Moreover, the information displayed in the debugger user interfaces can change automatically, responsive to user interaction manipulating the application. For example, information displayed in the debugger user interfaces can change automatically responsive to user interaction manipulating source code in an IDE, or by user interaction manipulating the information presented in the debugger user interfaces.

System 100 instead or in addition, may include one or more mobile devices including but not limited to mobile devices such as mobile device 120. Mobile device 120 can be a smart phone, PDA, feature phone or other mobile device. Mobile device 120 may include an application engine 124, an application 122 comprising an application being debugged and a debug stub 126 as well as various other components common to mobile devices. A mobile device is described more fully below with respect to FIG. 6.

As described above, a debugger 106 can be launched on a computer such as computer 102. The debugger 106, in response to user input selecting a mobile device application, can launch the mobile device application in debug mode on a mobile device such as mobile device 120. Debugging interactions can take place such that debugging activities conducted by a user on computer 102 are displayed in an instance of a debugger user interface such as debugger user interface 110 on computer 102. The debugging activities can debug an application such as application 122 executing on the mobile device 120. Results of debugging activities can be displayed in debugger user interface 110.

Debugging activities can continue until an interruption event occurs. An interruption event can be an event such as but not limited to detection of events such as but not limited to: depression of a back key from a first page of the application, depression of a home or search button on the mobile device, invoking a built-in phone functionality, receiving a notification (e.g., a toast notification) or receiving an incoming communication such as a call or text. An interruption event changes the state of the application from a first state to a second state. In response to detecting such a change in state of the application, the application may be tombstoned. When the application is tombstoned the debug session (e.g., debug session 1 112) on the software development computer is terminated. In response to navigation back to the application, the tombstoned application is restarted automatically in debug mode, without manual initiation of a new debugging session. Moreover, a new debug session (e.g., debug session 2 114) can be started. User debug interactions continue to appear in the same instance of the debugger user interface 110, making it appear to the developer that the same instance of the application is being debugged as it progresses through various states (activation, deactivation, suspension, etc.) rather than multiple instances of the same application are being debugged. It will be appreciated that although two debug sessions are described, more than two debug sessions can be created and viewed in the single instance of the debugger user interface. That is, debug interactions can be displayed in debugger user interface 110 for multiple debug sessions resulting from automatic (programmatically without user intervention) reattachment of a debugger to an application running on a mobile device multiple times as the application moves from activated to deactivated and reactivated states. This is represented in FIG. 1 by the hatched lines of debug session 116.

Figure 2:
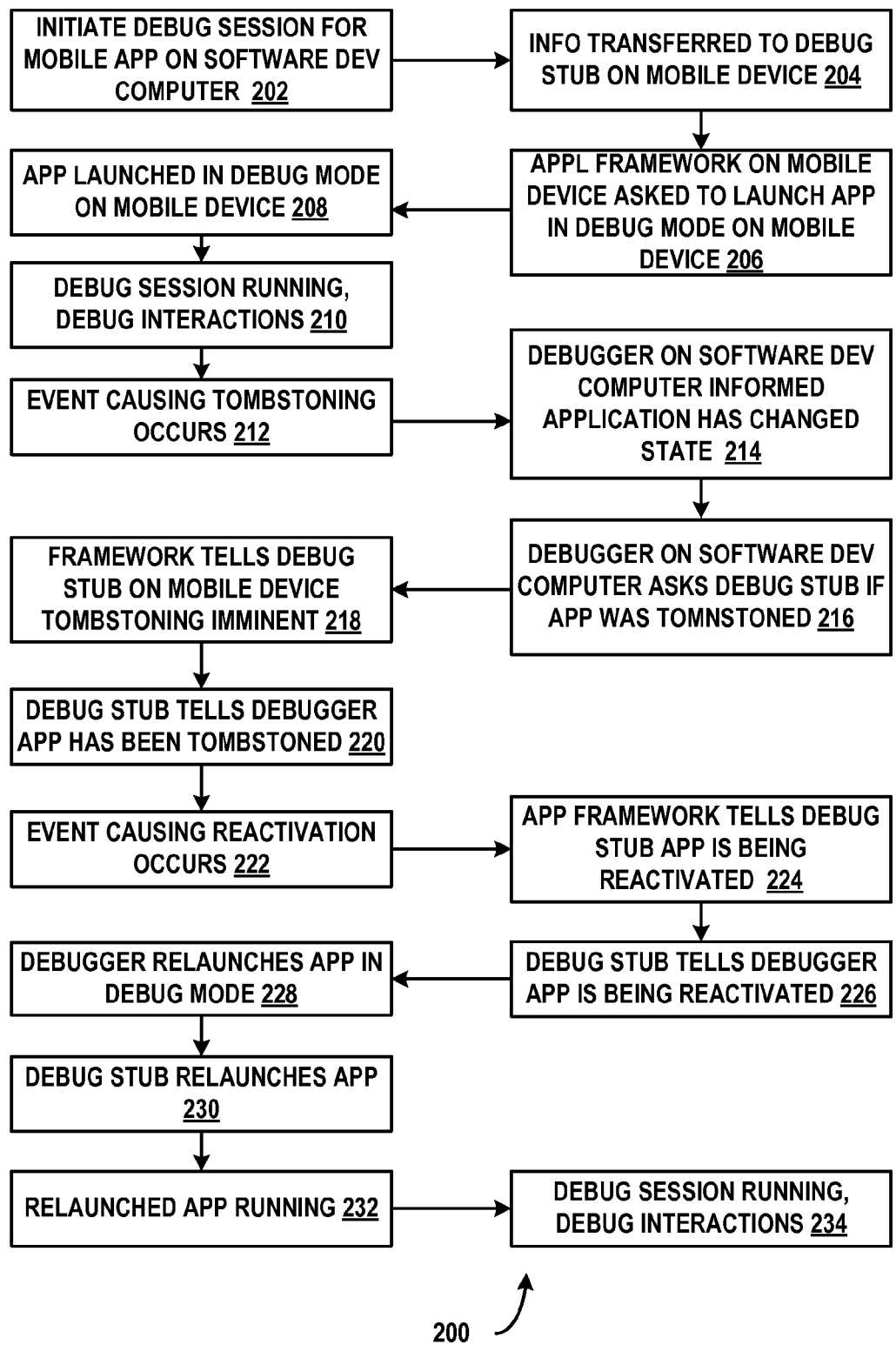
FIG. 2 is a flow diagram of an example of a method 200 that automatically reattaches a debugger to a reactivated application on a mobile device in accordance with aspects of the subject matter disclosed herein.

FIG. 2 is an example of a method 200 that reattaches a debugger to a restarted application in accordance with aspects of the subject matter disclosed herein. Method 200 can be implemented on a system such as but not limited to the one described with respect to FIG. 1. Some of the actions described below can be optional. Some of the actions described can be executed in a sequence that differs from that described below.

Referring now to FIG. 2 at 202 a first debug session for a mobile device application is initiated on a software development computer. To initiate a debug session, a mobile device application debugger is initiated on the software development computer. A mobile device application is selected for debugging. A mobile device debugger can execute within an IDE or outside of an IDE. The IDE can be an IDE such as but not limited to the IDE described with respect to FIG. 4. A mobile device debugger can be a debugger such as the debugger described above with respect to FIG. 1 The mobile device application debugger can receive user input and one or more data sources (not shown) and display substantially simultaneously: source code of a program under interactive development and run time debugging information based on data structures and/or objects associated with the application or program being debugged. The information displayed in a debugger user interface can be displayed automatically (e.g., without human intervention to request the display of the information). Moreover, the information displayed in the debugger user interfaces can change automatically responsive to user interaction manipulating the application. For example, information displayed in the debugger user interfaces can change automatically responsive to user interaction manipulating source code in an IDE, or by user interaction manipulating the information presented in the debugger user interfaces.

At 204 the debugger on the software development computer can transfer information concerning the debug session for the mobile device application to a debug stub on the mobile device. The debug stub is a piece of code that interacts with the debugger on the software development computer and serves to monitor the state of the mobile device application running on the mobile device. At 206 the debug stub on the mobile device can communicate with the application engine executing on the mobile device. The debug stub can direct the application engine to launch the mobile device application on the mobile device in debugging mode. At 208 in response to the communication from the debug stub executing on the mobile device, the application engine on the mobile device can launch the mobile device application on the mobile device in debug mode. At 210 the debugging session (e.g., a first debug session) can execute on the software development computer and debugging interactions can occur between the application being debugged on the mobile device and the debugger engine on the software development computer. Debugging interactions and activities can be displayed in a debugger user interface 110 on the software development computer.

At 212 an event that causes tombstoning of the application can occur. At 214 in response to detection of the tombstoning-causing event, the debugger on the software development computer can be informed that an event that causes the application to change state has happened. At 216 the debugger on the software development computer can ask the debug stub if the application has been tombstoned. At 218 the application framework on the mobile device can inform the debug stub on the mobile device that the application is going to be tombstoned. At 220 the debug stub on the mobile device can inform the debug engine on the software development computer that the application is tombstoned. At 222 on the mobile device, some event can occur that causes the application to be reactivated (restarted). Events that cause the application to be reactivated include navigation back to the application. Other events that can cause the application to be reactivated include receiving a result from an application called by the application being debugged. At 224 the application framework on the mobile device can inform the debug stub that the application is being reactivated. When the application is reactivated, it can be restored with the temporary values that were stored when the application was deactivated. This type of activation is called hydration.

At 226 the debug stub on the mobile device can inform the debug engine on the software development that the application is being rehydrated on the mobile device. At 228 the debugger engine can relaunch the application for debugging. Temporary values stored in the memory of the mobile device when the application was deactivated can be restored so that the application continues executing at the place it was when it was suspended. A second debug session can be initiated on the software development computer. The debugger on the software development computer can transfer information concerning the debug session for the application to the debug stub on the mobile device. At 230 the debug stub can reactivate the rehydrated application for debugging on the mobile device. The debug stub on the mobile device can use the application framework to launch the application for debugging. At 232 the application can be reactivated with the stored values restored and at 234 the debugging interactions can continue. The debugger user interface can display debug information from the second debug session in the debugger user interface that displayed the debug information from the first debug session. This cycle of detecting a change of state, creating a new debug session on the software development computer and reattaching the debugger to the mobile device application executing on the mobile device can continue multiple times. To the developer debugging the mobile device application, it appears that a single debug session is following an application as it passes through various states.

Example of a Suitable Computing Environment

Figure 3:
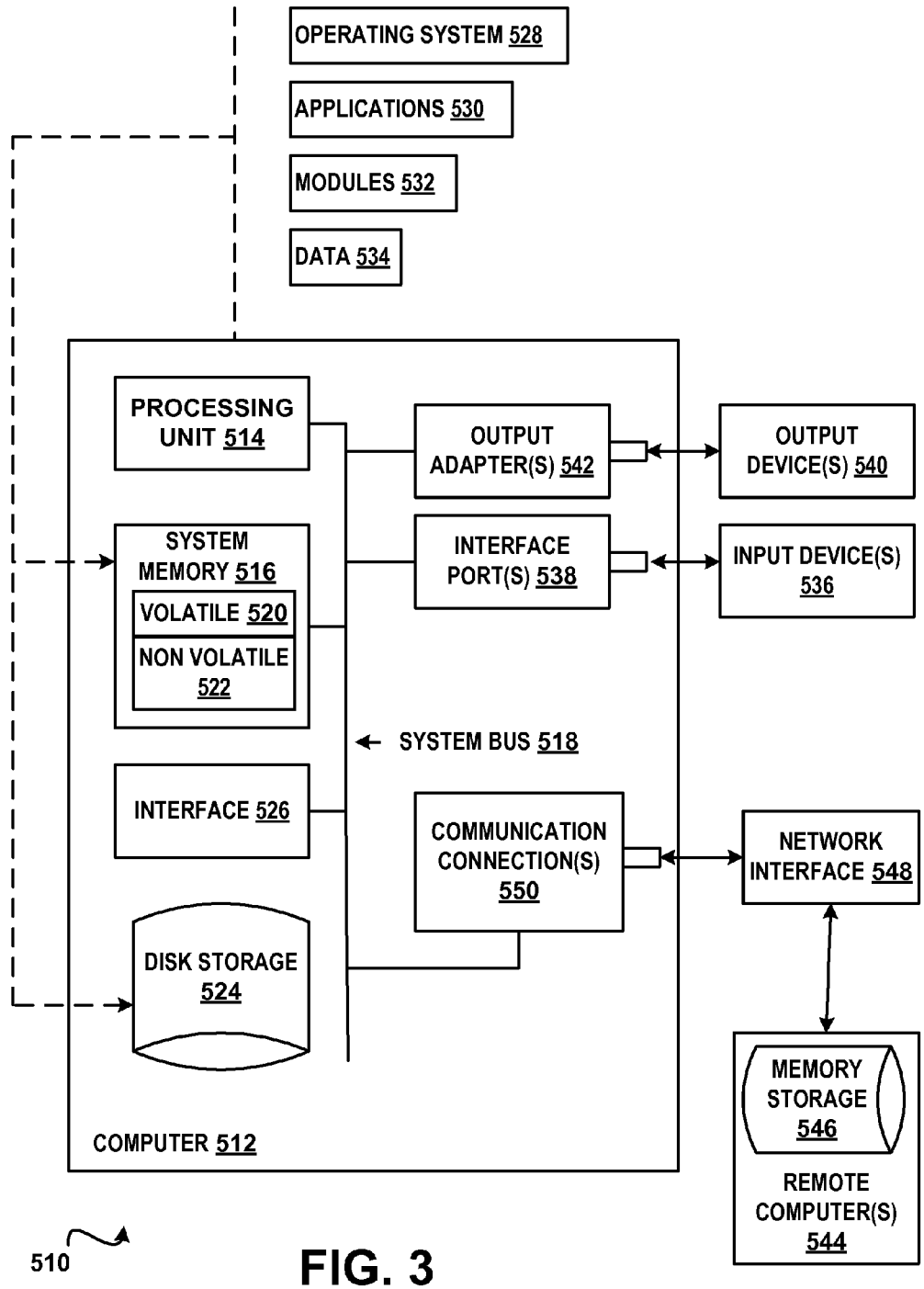
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
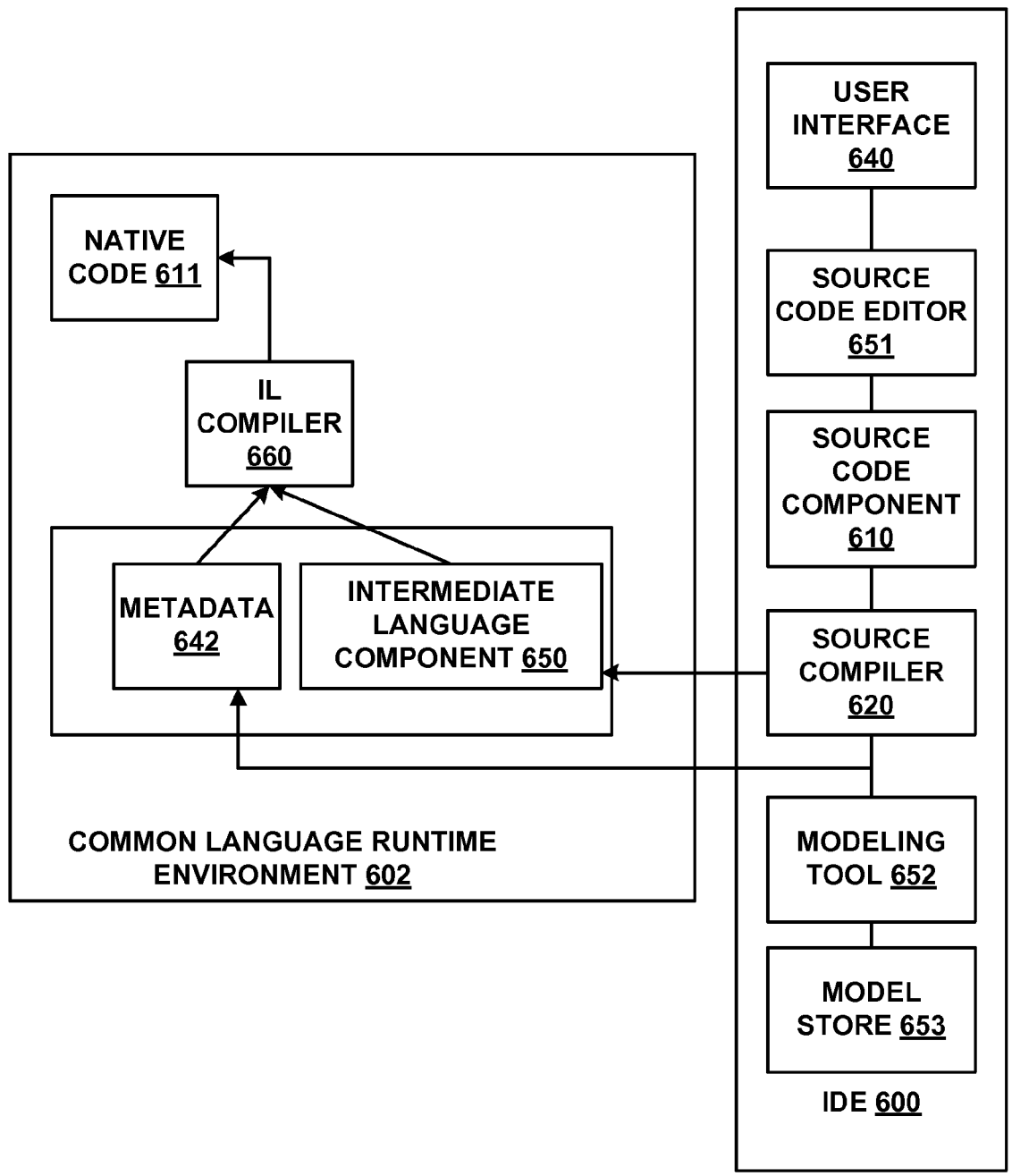
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., VISUAL BASIC®, VISUAL J#®, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-particular programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Figure 5:
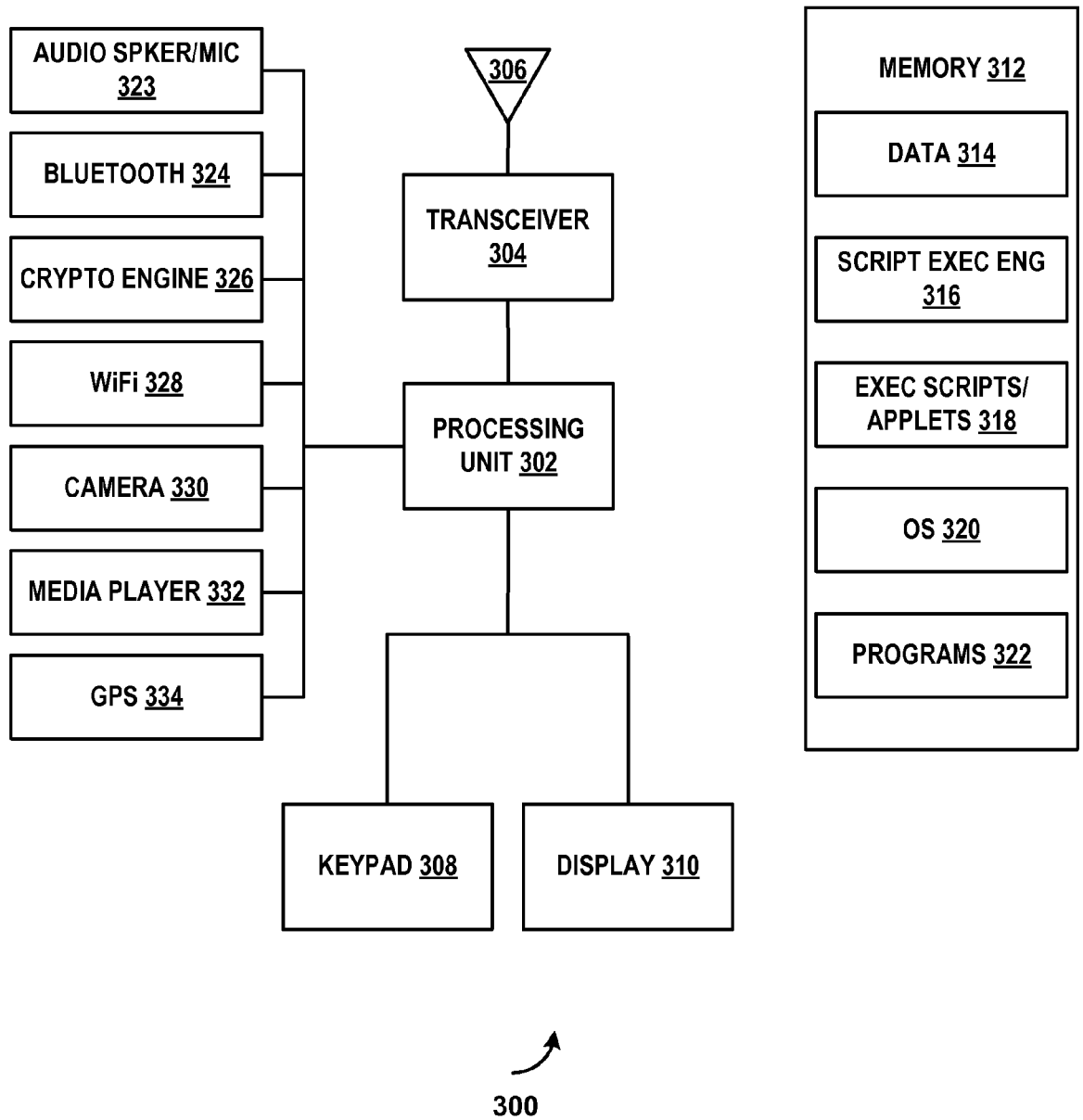
FIG. 5 is a block diagram of an example of a mobile device 300 in accordance with aspects of the subject matter disclosed herein.

FIG. 5 is an example of a mobile device 300. The mobile device 300 may be a cellular telephone, a smart phone, a personal digital assistant, a Bluetooth™ accessory or other portable device. The mobile device 300 may also be a computer with similar characteristics to the computer described with respect to FIG. 3 or may have a more limited capability platform with peripherals that are integral to the device, including but not limited to a built-in camera and display/keypad or touch screen.

The mobile device 300 may include a processing unit 302. The processing unit 302 may be a single chip processor with volatile and non-volatile memory (not shown), such as an ARM™ family processor, although other processors may also be used. The mobile device 300 may include a transceiver 304 for communication with a host device. The transceiver 304 may support wireless communication via antenna 306, although the transceiver may support wireline communication in addition or alternatively. In a wireless configuration the transceiver 304 may support short-range communication, such as Wi-Fi, or may support wide-area communication via a cellular telephone or PCS infrastructure.

A user interface may be supported by a keypad 308 and a display 310. The keypad function may be incorporated in a touchscreen version of the display 310. A memory 312 can include both volatile and nonvolatile memory. The memory 312 may store data 314, including locally generated information such as telephone numbers as well as download information such as Web pages. The memory 312 may also store executable instructions that implement a script execution engine 316 such as a Java virtual machine or similar execution environment. Executable scripts or application/applet 318 may be interpreted and/or executed by the script execution engine 316. An operating system 320 may be used to support basic functions in the mobile device 300. Operating system 320 may also support user interface and communication primitives. Functions of the mobile device 300 may be supported by native or downloaded programs 322. Such programs may be associated with functions including but not limited to dialing a telephone and power management.

One or more built-in hardware or virtual peripherals including but not limited to a Bluetooth wireless capability 324, a cryptographic engine 326, a Wi-Fi transceiver 328, a global positioning satellite (GPS) receiver 334, a camera 330 a media player 332, etc. While some of these peripherals may include hardware, each of the peripherals may be associated with applications that support its interface to the mobile device 300 as well as support its user interface. Audio circuits 323 may include one or more speakers and one or more microphones.

While the subject matter disclosed herein has been described in connection with the figures, it is to be understood that modifications may be made to perform the same functions in different ways.

What is claimed:

1. A method comprising:
reattaching a mobile device application debugger of a software development computer to an application executing on a mobile device by:
initiating a first debug session on the software development computer, the first debug session comprising debugging interactions associated with a first state of the application executing on the mobile device and displaying the debugging interactions associated with the first state of the application in a first instance of a debugger user interface on the software development computer; and
in response to detecting a change in state of the application from the first state to a second state, initiating a second debug session on the software development computer, the second debug session comprising debugging interactions associated with the second state of the application and displaying the debugging interactions associated with the second state of the application in the first instance of the debugger user interface on the software development computer,
wherein the first debug session and the second debug session differ,
wherein the mobile device application debugger comprises a debugger user interface module that displays in the first instance of the debugger user interface, the debugging interactions from the first debug session associated with the first state of the application and the debugging interactions from the second debug session associated with the second state of the application.

2. The method of claim 1, wherein the state of the application comprises one of
launching, activation, or deactivation.

3. The method of claim 1, further comprising:
receiving a notification on the software development computer of a change in state of the application from a debug stub executing on the mobile device.

4. The method of claim 1, further comprising:
receiving a notification on the software development computer that the application has been activated.

5. The method of claim 4, further comprising:
wherein temporary values stored in a memory of the mobile device are restored in the activated application.

6. The method of claim 4, further comprising:
receiving the notification from a debug stub executing on a mobile device comprising a smartphone, a personal digital assistant (PDA) or a feature phone.

7. A system comprising:
a processor and a memory of a software development computer; and
at least one module on the software development computer, the at least one module configured to cause the processor to automatically reattach a mobile device application debugger to an application running on a mobile device by:
initiating a first debug session on the software development computer, the first debug session comprising debugging interactions associated with a first state of an application and displaying the debugging interactions associated with the first state of the application in a single instance of a debugger user interface on the software development computer; and in response to detecting a change in state of the application from the first state to a second state, initiating a second debug session on the software development computer, the second debug session comprising debugging interactions associated with the second state of the application and displaying the debugging interactions associated with the second state of the application in the single instance of the debugger user interface on the software development computer, wherein the first debug session and the second debug session differ, wherein the mobile device application debugger comprises a debugger user interface module that displays in the single instance of the debugger user interface, debug interaction information from the first debug session associated with the first state of the application and debug interaction information from the second debug session associated with the second state of the application.

8. The system of claim 7, wherein the state of the application comprises one of launching, activation, deactivation or hydration.

9. The system of claim 7, wherein the mobile device application debugger receives notification of a change in state of the application from a debug stub executing on the mobile device.

10. The system of claim 9, wherein the debug stub monitors the state of the application.

11. The system of claim 10, wherein the mobile device application debugger on the software development computer receives a notification that the mobile device application has been hydrated.

12. The system of claim 11, wherein the notification is received from a debug stub executing on the mobile device.

13. The system of claim 7, wherein the mobile device comprises a smartphone, a personal digital assistant (PDA) or a feature phone.

14. A computer-readable storage memory comprising computer-executable instructions which when executed cause at least one processor on a software development computer to:

initiate a first debug session on the software development computer, the first debug session comprising debugging interactions associated with a first state of an application executing on a mobile device and displaying the debugging interactions associated with the first state of the application in a first instance of a debugger user interface on the software development computer;

in response to detecting a change in state of the application from the first state to a second state, automatically without human intervention initiating a second debug session on the software development computer, the second debug session comprising debugging interactions associated with the second state of the application and displaying the debugging interactions associated with the second state of the application in the first instance of the debugger user interface on the software development computer, and instantiate a first instance of the debugger user interface, wherein debug interaction information from a first debug session associated with the first state of the application and debug interaction information from a second debug session associated with the second state of the application are displayed in the first instance of the debugger user interface, wherein the first debug session and the second debug session differ.

15. The computer-readable storage memory of claim 14, comprising further computer-executable instructions, which when executed cause the at least one processor to:

detect a change of state of the application, wherein the state comprises one of launching, activation or deactivation.

16. The computer-readable storage memory of claim 14, comprising further computer-executable instructions, which when executed cause the at least one processor to:

receive notification of a change in state of the application from a debug stub executing on the mobile device.

17. The computer-readable storage memory of claim 16, wherein the debug stub monitors the state of the application.

18. The computer-readable storage memory of claim 14, comprising further computer-executable instructions, which when executed cause the at least one processor to:

receive notification of a change in state of the application wherein the state is one of launching, activation or deactivation.

19. The computer-readable storage memory of claim 14, comprising further computer-executable instructions, which when executed cause the at least one processor to:

receive notification of a change in state of the application from a debug stub executing on the mobile device, wherein the mobile device is a smartphone, a personal digital assistant (PDA) or a feature telephone.

20. The computer-readable storage memory of claim 14, comprising further computer-executable instructions, which when executed cause the at least one processor to:

receive notification of a change in state of the application wherein the state is one of activation, wherein temporary values stored in a memory of the mobile device are restored in the activated application.

* * * * *